United States Patent
Fritz et al.

(10) Patent No.: US 6,314,854 B1
(45) Date of Patent: Nov. 13, 2001

(54) SAW BLADES WITH CONVEX GROUND SAW TOOTH FLANKS

(75) Inventors: Heinz Fritz, Herbrechtingen; Otmar Riedel, Brensbach, both of (DE)

(73) Assignee: Roehm GmbH Chemische Fabrik, Darmstadt (DE)

( * ) Notice: Subject to any disclaimer, the term of this patent is extended or adjusted under 35 U.S.C. 154(b) by 0 days.

(21) Appl. No.: 09/671,776

(22) Filed: Sep. 27, 2000

Related U.S. Application Data

(63) Continuation of application No. 08/463,276, filed on Jun. 5, 1995, now abandoned.

(30) Foreign Application Priority Data

Jul. 5, 1994 (DE) .................................................. 44 23 434

(51) Int. Cl.$^7$ .............................. B23D 57/00; B27B 33/08
(52) U.S. Cl. ................................ 83/855; 83/835; 83/846; 83/848; 83/851
(58) Field of Search ................... 83/836, 840, 841–843, 83/853–855, 852, 835, 676, 838, 839, 845, 851, 847, 848, 849, 846, 850, 661; 407/22, 25, 26–29, 42, 116

(56) References Cited

U.S. PATENT DOCUMENTS

| | | | |
|---|---|---|---|
| 295,967 | * 4/1884 | Abbott | 83/835 |
| 2,356,868 | 8/1944 | Miller . | |
| 3,079,669 | 3/1963 | Bryant . | |
| 3,171,457 | 3/1965 | Brown . | |
| 3,309,756 | * 3/1967 | Segal | 83/851 X |
| 3,629,920 | 12/1971 | Loos . | |
| 3,745,869 | 7/1973 | Ludwig . | |
| 3,810,410 | 5/1974 | Athanasoulas . | |
| 4,011,783 | 3/1977 | Mobley . | |
| 4,012,820 | * 3/1977 | Nowak | 83/835 X |
| 4,173,914 | * 11/1979 | Vollmer et al. | 83/848 |
| 4,222,298 | 9/1980 | James . | |
| 4,604,933 | * 8/1986 | Lesher et al. | 83/851 |
| 4,848,205 | 7/1989 | Suzuki et al. . | |
| 5,165,319 | 11/1992 | Snyder et al. . | |
| 5,197,831 | 3/1993 | Shiratori et al. . | |
| 5,331,876 | 7/1994 | Hayden, Sr. . | |
| 5,365,986 | * 11/1994 | Hooser | 83/848 X |
| 6,220,139 | * 4/2001 | Kobayashi et al. | 83/835 |

FOREIGN PATENT DOCUMENTS

| | | |
|---|---|---|
| 226981 | 5/1943 | (CH) . |
| 439700 | 7/1967 | (CH) . |
| 157639 | 1/1905 | (DE) . |
| 640987 | 1/1937 | (DE) . |
| 25 16 137 | 10/1976 | (DE) . |
| 77 04 802 | 6/1977 | (DE) . |
| 27 53 509 | 7/1978 | (DE) . |
| 27 56 204 | 7/1978 | (DE) . |
| 27 06 774 | 8/1978 | (DE) . |
| 85 32 717.4 U | 3/1986 | (DE) . |
| 3541-077-A1 | 5/1987 | (DE) . |
| 89 12 432.4 U | 2/1990 | (DE) . |
| 834109 | 11/1938 | (FR) . |
| 5984 | 3/1892 | (GB) . |
| 713368 | 8/1954 | (GB) . |
| WO 94/20271 | 9/1994 | (WO) . |

\* cited by examiner

*Primary Examiner*—Boyer Ashley
(74) *Attorney, Agent, or Firm*—Oblon, Spivak, McClelland, Maier & Neustadt, P.C.

(57) ABSTRACT

A saw blade has teeth which are located on a carrier blade. Saw teeth flanks are curved and convex. A transition point between a cutting edge of the saw tooth and the curved convex saw tooth flank is such that a spacing distance between a radial center of the saw tooth flank and a radial plane of symmetry of the saw tooth is greater than a spacing distance between the transition point and the plane of symmetry.

20 Claims, 2 Drawing Sheets

SAW BLADES WITH CONVEX GROUND SAW TOOTH FLANKS

This application is a Continuation of application Ser. No. 08/463,276 filed on Jun. 5, 1995, now abandoned.

BACKGROUND OF THE INVENTION

1. Field of the Invention

The invention is directed to saw blades with convex ground saw tooth flanks for producing, especially, planar and smooth cut surfaces in the processing of plastics or metal, for example.

2. Description of the Related Art

There are many different types of saw blades. The shape of the saw teeth with regard to their separation properties is of special importance. For example, German Laid-open Application No. 27 56 204 describes a saw blade which cuts materials without any burrs and which has teeth that are tooth-shaped. The cutting edge of the teeth there incline from one end to the other and the ends of the cutting edges of succeeding teeth alternately have angular surfaces, each of which extends by an angle which deviates from the inclining cutting edge and an interval based on the side surface.

German Laid-open Application No. 27 53 509 is directed to a motor saw blade with unset teeth along at least one longitudinal edge of the saw blade. The teeth consist of alternating rough and fine processing teeth. The fine processing teeth are centripetally tapered on the flanks, while the rough processing teeth are considerably thinner and somewhat longer than the fine processing teeth. Such saw blades allow for high cutting speeds.

German Laid-open Application No. 25 16 137 describes circular saw blades for separating, notching or grooving metal pieces with different roughing and shaving teeth, each of which has a main cutting edge which is separated into a center and two lateral sections, with a center main cutting edge section having a different width, and which has different setting angles for the lateral main cutting edge sections. The center main cutting edge section of the roughing teeth, which is located on a mutual cutting edge circle, is wider than the center main cutting edge section of the shaving teeth, which is located on the seam cutting edge circle. The setting angle of the lateral main cutting edge sections of the shaving teeth is larger than the setting angle of the lateral main cutting edge sections of the roughing teeth. This saw tooth configuration primarily reduces the specific loads of the main cutting edge sections caused by sawdust.

German Utility Model No. 89-12 432.4 describes a circular saw blade with two groups of teeth. The teeth of one group are arranged on a larger diameter than the teeth of the other group. A tooth of the one group is followed by a tooth of the other group in the circumferential direction and the shape of the teeth of the one group has a trapezoidal cross section while the shape of the teeth of the other group is also trapezoidal.

German Laid-open Application No. 27 06 774 describes a circular saw blade with conical shaped teeth with tips pointed in a radial direction. The two cutting surfaces of the teeth are elongated from the tip in the axial direction until they are about three times as long as the width of the body of the cutting tooth. This design has a peeling effect when the saw exits the material which is to be sawed and thus prevents a splinter effect which otherwise occurs at the exit location.

When materials, above all plastics, metals or nonferrous (NF) metals are sawed, producing smooth cutting surfaces, i.e. avoiding saw furrows during the sawing process, is of great importance. Saw tooth configurations of conventional saw blades cause distinct saw furrows and require a finishing process to smooth the sawed surfaces.

SUMMARY OF THE INVENTION

It is an object of the present invention to provide a saw tooth configuration which minimizes saw furrows.

The above and other objects are achieved according to the present invention by a saw blade comprising a carrier blade and a plurality of saw teeth circumferentially spaced along the periphery of the carrier blade, wherein said saw teeth each have a convexly curved flank on at least one lateral side of a radial plane of symmetry of the saw tooth.

It was unexpectedly found that saw blades according to the invention to a great extent avoid saw furrows when sawing ferrous metals, NF metals and especially plastics.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
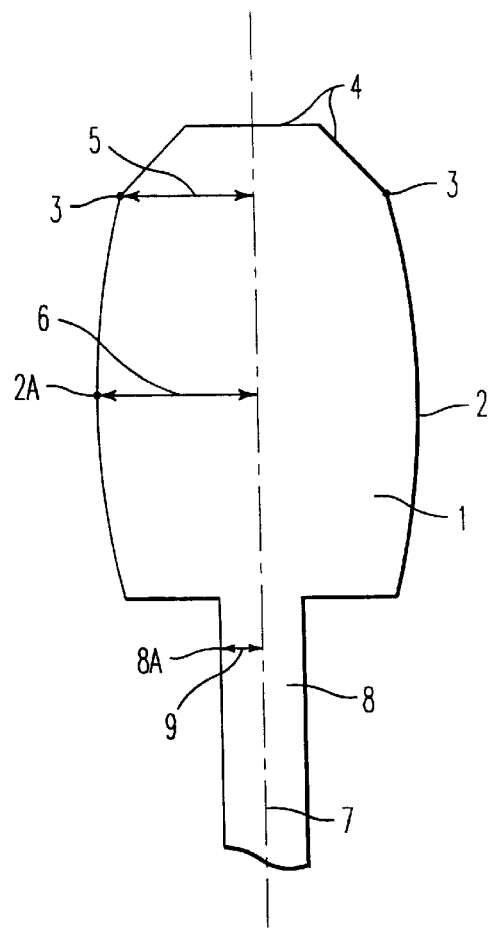
FIG. 1 is a schematic detail of a saw tooth configuration according to a first embodiment of the invention.

FIG. 1 shows a schematic detail of a saw tooth 1 according to an embodiment of the invention. The saw blade configuration shown in FIG. 1 has curved, convex saw tooth flanks 2 which, to a great extent, avoid saw furrows when sawing ferrous metals, NF metals and especially plastics. The flanks 2 extend more than halfway along both lateral sides from one end of the saw tooth 1 towards an opposite end of the saw tooth 1. A sharp transition point 3 between straight cutting edges 4 of the saw tooth 1 and the saw tooth flank 2 is such that a first spacing distance 6 between a radial center 2A of the saw tooth flank 2 and a radial plane of symmetry 7 of the saw tooth 1 is larger than a second spacing distance 5 between the transition point 3 and the radial plane of symmetry 7 of the saw tooth 1. This configuration prevents the creation of a pronounced circumferential edge between the cutting edges 4 and the saw tooth flank 2 which would otherwise be in direct contact with the material which is to be sawed.

Figure 2:
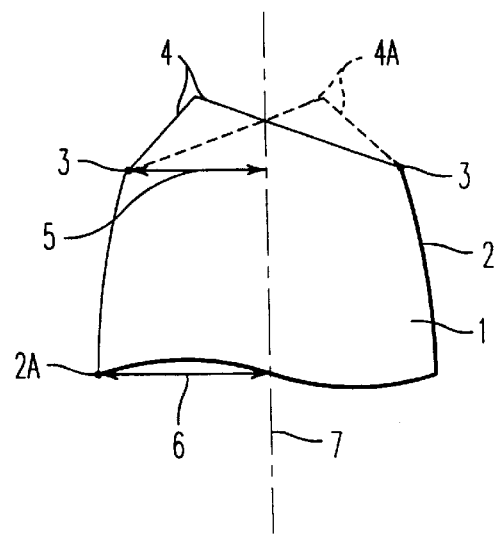
FIG. 2 is a schematic detail of a saw tooth configuration according to a second embodiment of the invention.

The cutting edges 4 of the saw tooth 1 can be shaped in many different ways. For example, in FIG. 1, the cutting edges 4 have a symmetrical, tetragonal, trapezoidal shape, whereby identical saw teeth 1 are located on a carrier blade 8 at regular intervals, corresponding to the state of the art. The second spacing distance 5 between the transition point 3 and the radial plane of symmetry 7 of the saw tooth 1 is larger than a third spacing distance 9 between an outer edge 8A of the carrier blade 8 and the plane of symmetry 7 passing through the carrier blade 8. It is also possible for successive saw teeth 1 on the carrier blade 8 to have different cutting edge configurations. For example, in the second embodiment shown in FIG. 2, the saw tooth 1 has straight cutting edges 4 with an asymmetric shape with respect to the radial plane of symmetry 7. The next subsequent saw tooth along the circumference of the carrier blade has cutting edges 4A which are laterally reversed with regard to the radial plane of symmetry 7, while yet the next subsequent saw tooth along the circumference of the carrier blade has cutting edges 4 with the same asymmetric position as the first cutting edges 4.

Figure 3:
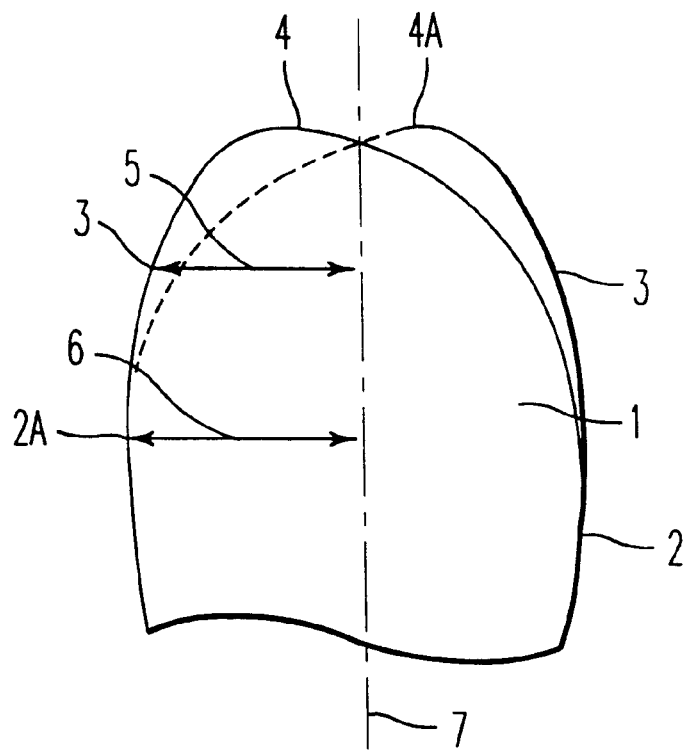
FIG. 3 is a schematic detail of a saw tooth configuration according to yet a third embodiment of the invention.

FIG. 3 shows a third embodiment of the saw tooth 1 in which a convexly curved cutting edge 4 has a hyperbolic or parabolic profile and the transition point 3 between the curved cutting edge 4 and the saw tooth flank 2 is smooth. Again, each circumferentially subsequent saw tooth on the carrier blade has convexly curved cutting edges 4A which are laterally reversed with regard to the radial plane of symmetry 7.

Such saw blades with alternating cutting edge configurations on the saw teeth are especially advantageous for the processing of plastics where the goal is to have no or only minimal saw furrows on both sawing surfaces which result from the sawing process, while at the same time minimizing the effect of corner splintering.

Preferably, the cutting edges 4 of the saw teeth 1 have a profile in which the portion of the lateral cutting edges which are mainly responsible for the strong change of the cutting forces, which in turn causes crumbling of the material on the cutting edge, is relatively small during the sawing process. See German Utility Model No. 89-12 432.4.

In general, the saw teeth 1 are made from materials which are much harder than the material which is to be sawed. Preferably, the body of each saw tooth 1 is made of super-speed steel and the cutting edges 4 are, in general, made from materials with an extremely high degree of hardness, such as diamond, preferably polycrystalline diamond, or tungsten carbide (Widia). The carrier blades 8 for the saw teeth 1 consist of either alloyed steel, for example, or light metal alloys which are heat-treated, or the same materials as the body of the saw teeth 1, for example, high-performance steel or super-speed steel. In general, there are 20 to 200 saw teeth 1 on the carrier blade 8.

The saw blade configuration in accordance with the invention makes it possible to avoid saw furrows on the sawing surfaces of the material which is sawed. This result is important for the processing of metals, such as aluminum or soft steels, as well as plastics which are used for optically demanding applications, such as polymethacrylate or polyamide. Another advantage is that the configuration of conventional sawing machines, in which the saw blade configuration to be used in accordance with the invention, does not need to be altered and adjusted very much. Saw blades which are configured in this manner can be used universally, for example in automatic panel dividers or circular saws, together with a carrier blade which is characteristic of the respective saw.

Certainly, numerous modifications and variations of the present invention are possible in light of the above teachings. Therefore, it is to be understood that the invention may be practiced otherwise than as specifically described herein.

We claim:

1. A saw blade comprising:
   a carrier blade having an outer edge; and
   at least one saw tooth mounted on the carrier blade at one end, said saw tooth having a straight cutting edge on an opposite end, said saw tooth also having convexly curved flanks positioned on both lateral sides of a plane of symmetry passing through the saw tooth and the carrier blade, said flanks extending more than halfway along both lateral sides from the one end of the saw tooth towards the cutting edge on the opposite end of the saw tooth, said cutting edge meeting with each of the flanks at a transition point;
   wherein a first spacing distance between a radial center of each of the flanks and the plane of symmetry is greater than a second spacing distance between the transition point and the plane of symmetry, said second spacing distance being greater than a third spacing distance between the outer edge of the carrier blade and the plane of symmetry; and
   wherein said straight cutting edge has a tetragonally trapezoidal cross section which is symmetrical with respect to the plane of symmetry.

2. A saw blade in accordance with claim 1, wherein said at least one saw tooth includes a plurality of saw teeth, each of said teeth being circumferentially spaced at one end along a periphery of the carrier blade, said saw teeth having differently configured cutting edges located alternately and successively on the carrier blade.

3. A saw blade in accordance with claim 2, wherein one of the plurality of saw teeth has a straight cutting edge with a triangular cross section that is asymmetrical with respect to the plane of symmetry.

4. A saw blade in accordance with claim 2, wherein one of the plurality of saw teeth has a smooth transition point and a convexly curved cutting edge with a hyperbolic cross section that is asymmetrical with respect to the plane of symmetry.

5. A saw blade in accordance with claim 2, wherein one of the plurality of saw teeth has a smooth transition point and a convexly curved cutting edge with a parabolic cross section that is asymmetrical with respect to the plane of symmetry.

6. A saw blade comprising:
   a carrier blade having an outer edge; and
   at least one saw tooth mounted on the carrier blade at one end, said saw tooth having a straight cutting edge on an opposite end, said saw tooth also having convexly curved flanks positioned on both lateral sides of a plane of symmetry passing through the saw tooth and the carrier blade, said flanks extending more than halfway along both lateral sides from the one end of the saw tooth towards the cutting edge on the opposite end of the saw tooth, said cutting edge meeting with each of the flanks at a transition point;
   wherein a first spacing distance between a radial center of each of the flanks and the plane of symmetry is greater than a second spacing distance between the transition point and the plane of symmetry, said second spacing distance being greater than a third spacing distance between the outer edge of the carrier blade and the plane of symmetry; and
   wherein said straight cutting edge has a triangular cross section which is asymmetrical with respect to the plane of symmetry.

7. A saw blade in accordance with claim 6, wherein said at least one saw tooth includes a plurality of saw teeth, each of said teeth being circumferentially spaced at one end along a periphery of the carrier blade, said saw teeth having differently configured cutting edges located alternately and successively on the carrier blade.

8. A saw blade in accordance with claim 7, wherein one of the plurality of saw teeth has a straight cutting edge with a tetragonally trapezoidal cross section that is symmetrical with respect to the plane of symmetry.

9. A saw blade in accordance with claim 7, wherein one of the plurality of saw teeth has a smooth transition point and a convexly curved cutting edge with a hyperbolic cross section that is asymmetrical with respect to the plane of symmetry.

10. A saw blade in accordance with claim 7, wherein one of the plurality of saw teeth has a smooth transition point and a convexly curved cutting edge with a parabolic cross section that is asymmetrical with respect to the plane of symmetry.

11. A saw blade comprising:

a carrier blade having an outer edge; and at least one saw tooth mounted on the carrier blade at one end, said saw tooth having a convexly curved cutting edge on an opposite end, said saw tooth also having convexly curved flanks positioned on both lateral sides of a plane of symmetry passing through the saw tooth and the carrier blade, said flanks extending more than halfway along both lateral sides from the one end of the saw tooth towards the cutting edge on the opposite end of the saw tooth, said cutting edge meeting with each of the flanks at a transition point;

wherein a first spacing distance between a radial center of each of the flanks and the plane of symmetry is greater than a second spacing distance between the transition point and the plane of symmetry, said second spacing distance being greater than a third spacing distance between the outer edge of the carrier blade and the plane of symmetry; and wherein said convexly curved cutting edge has a hyperbolic cross section which is asymmetrical with respect to the plane of symmetry.

12. A saw blade in accordance with claim 11, wherein said at least one saw tooth includes a plurality of saw teeth, each of said teeth being circumferentially spaced at one end along a periphery of the carrier blade, said saw teeth having differently configured cutting edges located alternately and successively on the carrier blade.

13. A saw blade in accordance with claim 12, wherein one of the plurality of saw teeth has a straight cutting edge with a triangular cross section that is asymmetrical with respect to the plane of symmetry.

14. A saw blade in accordance with claim 12, wherein one of the plurality of saw teeth has a sharp transition point and a straight cutting edge with a tetragonally trapezoidal cross section that is symmetrical with respect to the plane of symmetry.

15. A saw blade in accordance with claim 12, wherein one of the plurality of saw teeth has a smooth transition point and a convexly curved cutting edge with a parabolic cross section that is asymmetrical with respect to the plane of symmetry.

16. A saw blade comprising:

a carrier blade having an outer edge; and at least one saw tooth mounted on the carrier blade at one end, said saw tooth having a convexly curved cutting edge on an opposite end, said saw tooth also having convexly curved flanks positioned on both lateral sides of a plane of symmetry passing through the saw tooth and the carrier blade, said flanks extending more than halfway along both lateral sides from the one end of the saw tooth towards the cutting edge on the opposite end of the saw tooth, said cutting edge meeting with each of the flanks at a transition point;

wherein a first spacing distance between a radial center of each of the flanks and the plane of symmetry is greater than a second spacing distance between the transition point and the plane of symmetry, said second spacing distance being greater than a third spacing distance between the outer edge of the carrier blade and the plane of symmetry; and wherein said convexly curved cutting edge has a parabolic cross section which is asymmetrical with respect to the plane of symmetry.

17. A saw blade in accordance with claim 16, wherein said at least one saw tooth includes a plurality of saw teeth, each of said teeth being circumferentially spaced at one end along a periphery of the carrier blade, said saw teeth having differently configured cutting edges located alternately and successively on the carrier blade.

18. A saw blade in accordance with claim 17, wherein one of the plurality of saw teeth has a straight cutting edge with a triangular cross section that is asymmetrical with respect to the plane of symmetry.

19. A saw blade in accordance with claim 17, wherein one of the plurality of saw teeth has a smooth transition point and a convexly curved cutting edge with a hyperbolic cross section that is asymmetrical with respect to the plane of symmetry.

20. A saw blade in accordance with claim 17, wherein one of the plurality of saw teeth has a sharp transition point and a straight cutting edge with a tetragonally trapezoidal cross section that is symmetrical with respect to the plane of symmetry.

* * * * *